United States Patent
Subramanian et al.

(10) Patent No.: US 7,275,149 B1
(45) Date of Patent: Sep. 25, 2007

(54) SYSTEM AND METHOD FOR EVALUATING AND EFFICIENTLY EXECUTING CONDITIONAL INSTRUCTIONS

(75) Inventors: Senthil K. Subramanian, Richardson, TX (US); Hung T. Nguyen, Plano, TX (US)

(73) Assignee: VeriSilicon Holdings (Cayman Islands) Co. Ltd., Santa Clara, CA (US)

(*) Notice: Subject to any disclaimer, the term of this patent is extended or adjusted under 35 U.S.C. 154(b) by 102 days.

(21) Appl. No.: 10/396,265

(22) Filed: Mar. 25, 2003

(51) Int. Cl.
*G06F 9/00* (2006.01)
(52) U.S. Cl. .................................... 712/226
(58) Field of Classification Search ............... 712/226; 717/159, 160
See application file for complete search history.

(56) References Cited

U.S. PATENT DOCUMENTS

| | | | | |
|---|---|---|---|---|
| 3,577,190 A | * | 5/1971 | Cocke et al. | 712/226 |
| 5,920,716 A | * | 7/1999 | Johnson et al. | 717/141 |
| 6,016,543 A | * | 1/2000 | Suzuki et al. | 712/233 |
| 6,269,435 B1 | * | 7/2001 | Dally et al. | 712/8 |
| 6,279,101 B1 | * | 8/2001 | Witt et al. | 712/215 |
| 6,484,255 B1 | * | 11/2002 | Dulong | 712/224 |
| 6,513,109 B1 | * | 1/2003 | Gschwind et al. | 712/200 |
| 6,662,294 B1 | * | 12/2003 | Kahle et al. | 712/226 |
| 6,865,662 B2 | * | 3/2005 | Wang | 712/24 |
| 6,910,123 B1 | * | 6/2005 | Bosshart | 712/226 |
| 7,020,765 B2 | * | 3/2006 | Nguyen et al. | 712/200 |

* cited by examiner

*Primary Examiner*—Eddie Chan
*Assistant Examiner*—Jacob Petranek (57) ABSTRACT

A system, circuit, and method are presented for evaluating conditional execution instructions. The system, circuit, and method are adapted to receive an identification instruction comprising the size and the condition of execution of a block of conditional execution instructions. The system, circuit, and method may also be coupled to determine a position and for a conditional execution instruction within a block of conditional execution instructions. The system, circuit, and method can determine whether a conditional field, in which the conditional field comprises a type of conditional execution instruction, meets a condition of execution. By determining the size of the block of conditional execution by an identification instruction and determining the type of conditional execution instruction, the system, circuit and method advantageously decreases the code density of a set of instruction, and advantageously increases the overall performance of a processor.

20 Claims, 5 Drawing Sheets

First Block of Conditional Execution Instructions

Second Block of Conditional Execution Instructions

Fig. 4A

| Bit Position | Description |
| --- | --- |
| Bit [6] | 0 - Select Flag<br>1 - Select General Purpose Register |
| Bit [5] | 0 - Check for Flag not Set<br>1 - Check for Flag Set |
| Bit [4] | 0 - Do Not Update Load/Store Pointers<br>1 - Update Load/Store Pointers |
| Bit [3] | 0 - Choose hwflag<br>1 - Choose shwflag |
| Bit [2:0] | [000] - Overflow Flag<br>[001] - Guard Overflow Flag<br>[010] - Static Overflow Flag<br>[011] - Guard Static Overflow Flag<br>[100] - Carry Flag<br>[101] - Greater Than or Equal to Flag<br>[110] - Greater Than Flag<br>[111] - Zero Flag |

SYSTEM AND METHOD FOR EVALUATING AND EFFICIENTLY EXECUTING CONDITIONAL INSTRUCTIONS

BACKGROUND OF THE INVENTION

1. Field of the Invention

This invention relates to microprocessor design, and more particularly to a system, circuit, and method for conditional execution evaluation.

2. Description of the Related Art

The following descriptions and examples are not admitted to be prior art by virtue of their inclusion within this section.

Over the years, the use of microprocessors has become increasingly widespread in a variety of applications. Today, microprocessors may be found not only in computers, but also in a vast array of other products such as VCRs, microwave ovens, and automobiles. In some applications, such as microwave ovens, low cost may be the driving factor in the implementation of the microprocessor. On the other hand, other applications may demand the highest performance obtainable. For example, modem telecommunication systems may require very high speed processing of multiple signals representing voice, video, data, etc. Processing of these signals, which have been densely combined to maximize the use of available communication channels, may be rather complex and time consuming. With an increase in consumer demand for wireless communication devices, such real time signal processing requires not only high performance but also demands low cost. To meet the demands of emerging technologies, designers must constantly strive to increase microprocessor performance while maximizing efficiency and minimizing cost.

With respect to performance, greater overall speed of a microprocessor may be achieved by improving the speed of circuit devices, which form the microprocessor as well as architectural development that allow for optimal performance and operations. Speed may be extremely important in a variety of applications. As such, designers have evolved a number of speed enhancing techniques and architectural features. Among these techniques and features may include an instruction pipeline system.

A pipeline consists of a sequence of stages through which instructions pass as they are executed. In a typical microprocessor, each instruction comprises an operator and one or more operands. Thus, execution of an instruction is actually a process requiring a plurality of steps. In a pipelined microprocessor, partial processing of an instruction may be performed at each stage of the pipeline. Likewise, partial processing may be performed concurrently on multiple instructions in all stages of the pipeline. In this manner, instructions advance through the pipeline in assembly line fashion to emerge from the pipeline at a rate of one instruction every clock cycle.

The advantage of the pipeline generally lies in performing each of the steps in a simultaneous manner. To operate efficiently, however, a pipeline must remain full. If the flow of instructions in the pipeline is disrupted, clock cycles may be wasted while the instructions within the pipeline may be prevented from proceeding to the next processing step. In some cases, the microprocessor may be forced to abort the instructions within the pipeline before the instructions are fully processed. In particular, most programs executed by the microprocessor do not have linear code sequences, and instead have to execute different code sequences depending on the changing real-time conditions. Instructions, such as conditional branches, may cause the processing of instructions to flow out-of-order, and thereby decreases the pipeline throughput. For example, a conditional branch instruction may force the processor to clear out the pipeline and reissue a different set of instructions due to the branch instruction such an event may cause a time penalty, and causes a reduction in the overall efficiency of the microprocessor. Therefore, it would be advantageous to develop a process to at least minimize if not entirely overcome the negative effects of branch instructions within a pipeline.

As mentioned above, many program codes are not linear in nature, and therefore, the complete elimination of such branch instructions is unfeasible, even though eliminating branch instructions within a code sequence would dramatically improve the performance of the microprocessor. Conditional execution instructions can be used to replace the branch instructions and thereby, increasing the performance of the microprocessor. A conditional execution instruction, as described herein, is an instruction comprising a condition of execution, in which the condition must be met before the execution of the instruction is completed. If the condition of the instruction is met, the result of the conditional execution instruction is written to a desired register. Conversely, if the condition of execution is not met, the result would not be stored, and the microprocessor would resume processing of subsequent instructions. In such a manner, the microprocessor may continually issue and execute instructions without having to possibly clear the pipeline for a branch instruction. Therefore, the evaluation of conditional execution instruction would thereby enhance the efficiency of the pipeline, and thus, improve the performance of the microprocessor.

An instruction typically comprises an opcode of a fixed length, in which the opcode is a set of bits corresponding to a type of execution. In order for the microprocessor to identify if the instruction is marked for conditional execution, the microprocessor may append a fixed number of bits to the opcode of the instruction. However, by altering the opcode of an instruction, the code density decreases, in which code density attributes to how much memory allocation is used for a single set of instructions. As such, the power consumption of the microprocessor increases and the overall performance of the microprocessor decreases.

SUMMARY OF THE INVENTION

Conditional execution instructions may improve the performance of a processor by allowing instructions to continually flow through the microprocessor without deterring from an issued set of instructions. Moreover, by efficiently evaluating such instructions, the performance of the processor may further be improved. For example, characterizing the types of conditional execution instructions may efficiently increase the evaluation process of a conditional execution instruction. The types of conditional execution instructions may include a dynamic, static and general-purpose. A dynamic conditional execution instruction, as described herein, uses a dynamic hardware flag register for the condition of execution. A static conditional execution instruction, as described herein, utilizes a static hardware flag register that indicates to the condition of execution for a static conditional execution instruction. A general-purpose register instruction, as described herein, uses the content of a general-purpose register for the condition of execution. Each of the types of conditional execution instructions contains a conditional field, in which the conditional field is a set of bits that are unique to the individual types of conditional execution instructions.

In addition, the grouping of conditional execution instructions may also serve to benefit the microprocessor. Specifically, within a block of conditional execution instructions comprising one or more conditional execution instructions, a number of conditional execution instructions may be grouped together based on a set of predetermined dependencies. The conditional execution instructions are grouped together dependent on each other and currently being processed within the pipeline. A block of conditional execution instructions may include one or more groups of conditional execution instructions, in which the number may vary and the block of conditional execution instruction groups are non-interruptible (i.e., all instructions within the blocks of one or more groups are executable without any intervening interrupts). Thus, a block of conditional execution instructions must all be executed without interruptions. By grouping instructions together, the processor may be able to determine the end of a block of conditional execution instructions and therefore, may be able to determine how many conditional execution instructions are within a block. This may enable the processor to process each conditional execution instruction within the block according to the specified condition. A processor may be adapted to allow more than one conditional execution blocks to be issued and executed in parallel. As such, the grouping of conditional execution instructions may also be pertinent in determining a grouping (i.e., number) of conditional execution instructions that belong to a particular block.

There are two types of dependencies that the processor is adapted to detect prior to grouping instructions together. First, in order to ensure a dynamic flag of the dynamic hardware register is stable, the processor may group two or more conditional execution instructions in which the first one is a dynamic conditional execution instruction and a second one is either a static or general purpose conditional execution instructions. If the grouped instruction is a dynamic conditional execution instruction, the static flags are updated with the dynamic flags in the next cycle. If a dynamic conditional execution instruction is grouped together with a static conditional execution instruction, the conditional evaluations for both dynamic and static instructions would be based on the dynamic flag for one cycle. After the update of static flags during the next cycle, the continuing static conditional instructions are evaluated based on the updated static flags. Secondly, to ensure that the dynamic flag of the dynamic hardware register is stable, the processor does not group two dynamic conditional execution instructions together. As such, the processor prevents a dynamic flag corresponding to a first dynamic conditional execution instruction from getting overwritten by second dynamic conditional execution instruction. In addition, the grouping of conditional execution instructions may further allow the complete execution of a block of conditional execution instructions, in which the block may span multiple cycles to complete. By grouping the conditional execution instructions, the end of a block may be determined and thus, the processor may be able to determine the number of cycles it may take to execute the entire block of conditional execution instructions.

Subsequently, during execution of the block of conditional execution instructions, the size of the block (i.e. the number of conditional execution instructions making up the block of conditional execution instructions), the grouping information, and the conditional field, will be used to efficiently execute the conditional execution instruction. The processor may be able to identify a conditional execution instruction more efficiently and thereby, determine if the condition of execution is met.

A processor capable of issuing multiple blocks of conditional execution instructions, determining the size of the blocks, the condition for execution of the blocks, and where each conditional execution instruction is located within the blocks may improve the conditional execution instructions efficiency of the pipeline. Furthermore, by grouping the conditional execution instructions based on a set of predetermined dependencies, the pipeline of the high-speed processor may be utilized in an optimal manner. As such, by grouping the conditional execution instructions, a processing unit may be able to resourcefully execute an entire block of conditional execution instructions prior to executing a subsequent block of conditional execution instructions. Identifying the conditional field for each conditional execution instruction entails a more efficient determination of the conditional execution instruction.

A system, a circuit, and a method are contemplated herein for receiving and evaluating a conditional execution instruction. The conditional execution instruction is from a grouped number of conditional execution instructions, in which the grouped number of conditional execution instructions is within a block of conditional execution instructions. The system, circuit, and method may further identify the conditional execution instruction processed by the functional unit, determining where within the block of conditional execution instruction the conditional execution instruction is located, and determine if the condition is met.

In one embodiment, a computer system is contemplated herein for executing conditional execution instructions. In some cases, the computer system may include an identifying unit coupled to receive a tag for each of the grouped number of conditional execution instruction and an execution tag from a functional unit. The functional unit may comprise a unit adapted to process an instruction. The functional unit may comprise an arithmetic logic unit (ALU) or a multiply-accumulate and arithmetic unit (MAU). The functional unit may be coupled to receive an instruction and generate an execution tag upon the complete processing of the instruction. In addition, the identifying unit may further be coupled to compare the tag for each of the group number of conditional execution instruction to the execution tag to determine if a functional unit processed a conditional execution from the grouped number of conditional execution instructions.

In addition, the computer system may further include an evaluation unit coupled to determine where a conditional execution instruction from the grouped number of conditional execution instructions is located within the block of conditional execution instructions. The type of dependency of a block of conditional execution instructions determines the instruction grouping and is made relative to a conditional field, in which the conditional field comprises a type of conditional execution instruction, and in which the type of conditional execution instruction may involve dynamic, static or general purpose register.

The computer system may include an execution unit coupled to receive an identification instruction. The identification instruction may include a size of a subsequent block of conditional execution instructions, in which the size may indicate the number of conditional execution instructions contained within the block of conditional execution instructions. The identification instruction may further include a condition of execution for the subsequent block of conditional execution instructions, in which the condition of execution may be utilized for each of the block of conditional execution instruction. An evaluation unit may be coupled to receive a conditional field, in which the conditional field may determine if the condition of execution for each of the grouped number of conditional execution is met.

A circuit for conditional execution evaluation is also presented herein. Such a circuit may include an identifying unit coupled to detect a conditional execution instruction processed by a functional unit. The identifying unit may further be coupled to receive an execution tag, corresponding to an instruction (i.e., a conditional execution instruction), from the functional unit. In addition, the identifying unit may receive a tag corresponding to the conditional execution instruction, in which the tag represents a conditional execution within a block of conditional execution instruction. Furthermore, the identifying unit may also be coupled to compare the execution tag to the tag to determine if the functional unit processes a conditional execution instruction. In addition, the conditional execution may be grouped with one or more conditional execution instructions based on a dependency related to the group, and in which the grouped number of instruction is within the block of conditional execution instructions.

In addition, after determining a conditional execution instruction processed by the functional unit, the circuit may further include an evaluation logic coupled to receive the tag. The evaluation logic is further coupled to determine a position of the conditional execution instruction relative to the block of conditional execution instructions grouped together in the same cycle. Furthermore, the circuit may also include an execution logic coupled to receive an identification instruction, in which the identification instruction comprises a condition of execution for the conditional execution instruction. In addition, the execution logic is also coupled to receive a conditional field corresponding to the conditional execution instruction, in which the conditional field may comprise a type of conditional execution instruction for the conditional execution instruction. Furthermore, the execution logic may further be coupled to determine if the condition of execution is met. If the condition of execution is met, the result of the conditional instruction may be stored. Conversely, if the condition of execution is not met, then the result will not be written and the circuit will continue to evaluate subsequent conditional execution instructions.

A method may also be provided for determining where a conditional execution instruction from a grouped number of conditional execution instructions is located within a block of conditional execution instructions. The method may first include receiving a tag corresponding to each of the grouped number of conditional execution instructions. Furthermore, a functional unit processing an instruction may generate an execution tag, in which the execution tag and tag may be compared to determine if a conditional execution instruction of the grouped number of conditional execution instructions is currently being processed by the functional unit, If the tags matched, the position of the conditional execution instruction processed by the function unit is determined.

The method may also involve determining whether the conditional execution instruction satisfies the condition of execution. The method may include receiving a conditional field for each of the grouped number of conditional execution instructions, in which the conditional field comprises a type of conditional execution instruction. In addition, the method may also include receiving an identification instruction, in which the identification instruction comprises the condition of execution. To determine if the condition of execution is met, the type of conditional execution instruction may need to be identified. The method may advantageously reduce the code density, in which a conditional execution instruction is within a block of conditional execution instructions. Furthermore, the identification instruction, preceding the block of conditional execution instructions comprises the size (e.g. the number of conditional execution instructions within the block of conditional execution instructions) and the condition of execution. In addition, the method may allow multiple conditional execution instructions to process within a clock cycle. Thus, the method improves the efficiency of the pipeline and the overall performance of the processor.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
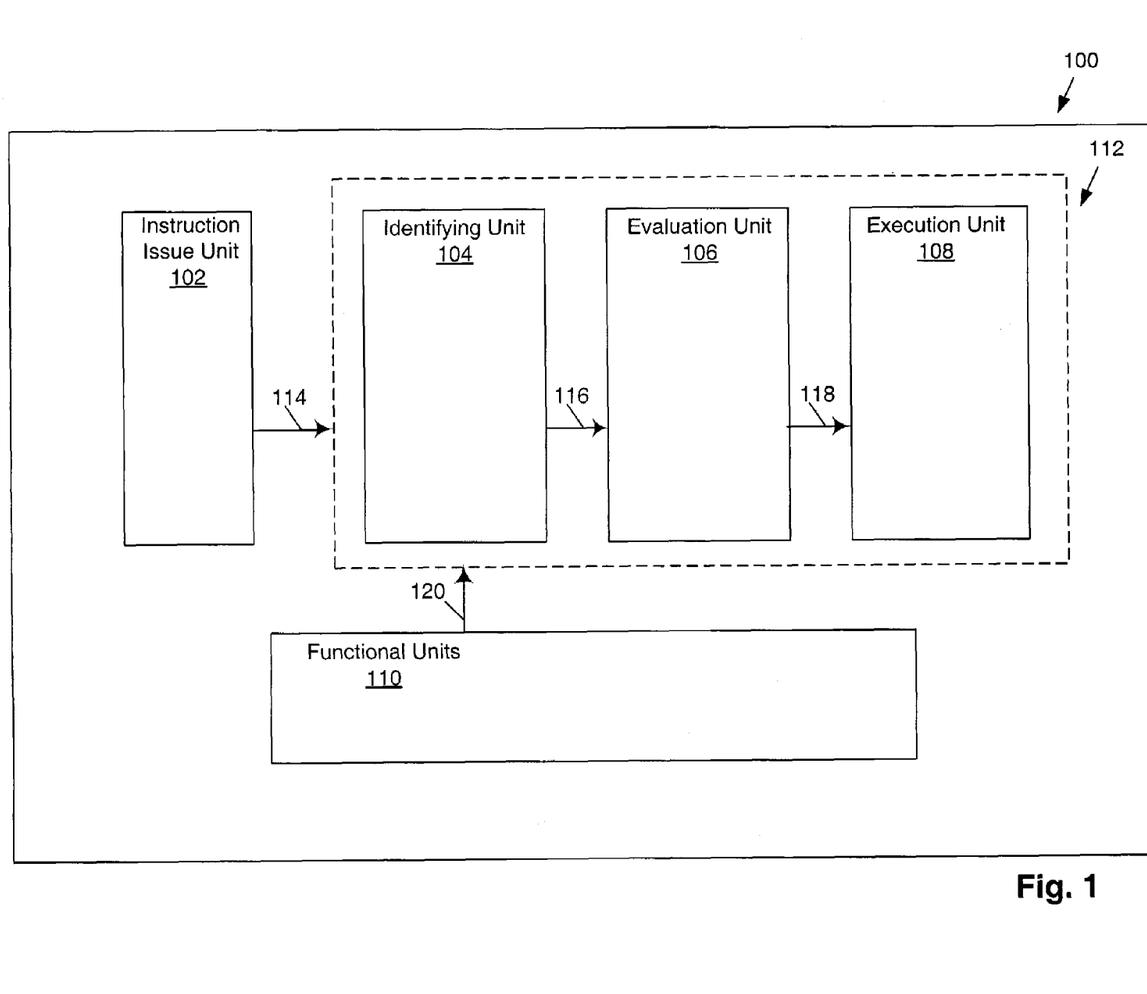
FIG. 1 is a block diagram illustrating one embodiment of a computer system for evaluating conditional execution instruction.

Turning to the drawings, exemplary embodiments of a system, circuit, and method for evaluating a block of conditional execution instructions are shown in FIGS. 1–5. FIG. 1 illustrates an embodiment of a computer system coupled to evaluate a block of conditional execution instructions. As shown in FIG. 1, processing unit 100 includes instruction issue unit 102, in which the instruction issue unit may comprise subsystem that forwards a block of conditional execution instructions. Furthermore, instruction issue unit 102, may further forward a tag. The tag is an encoded instruction, in which the position of a conditional execution instruction relative to a block of conditional execution instructions. Furthermore, instruction issue unit 102 may further forward a conditional field, in which the conditional field, as described herein, is a set of bits that identifies the type of conditional execution instruction that is encoded.

The type of conditional execution instruction may be used to determine if a conditional execution instruction meets a condition for execution.

Figure 2:
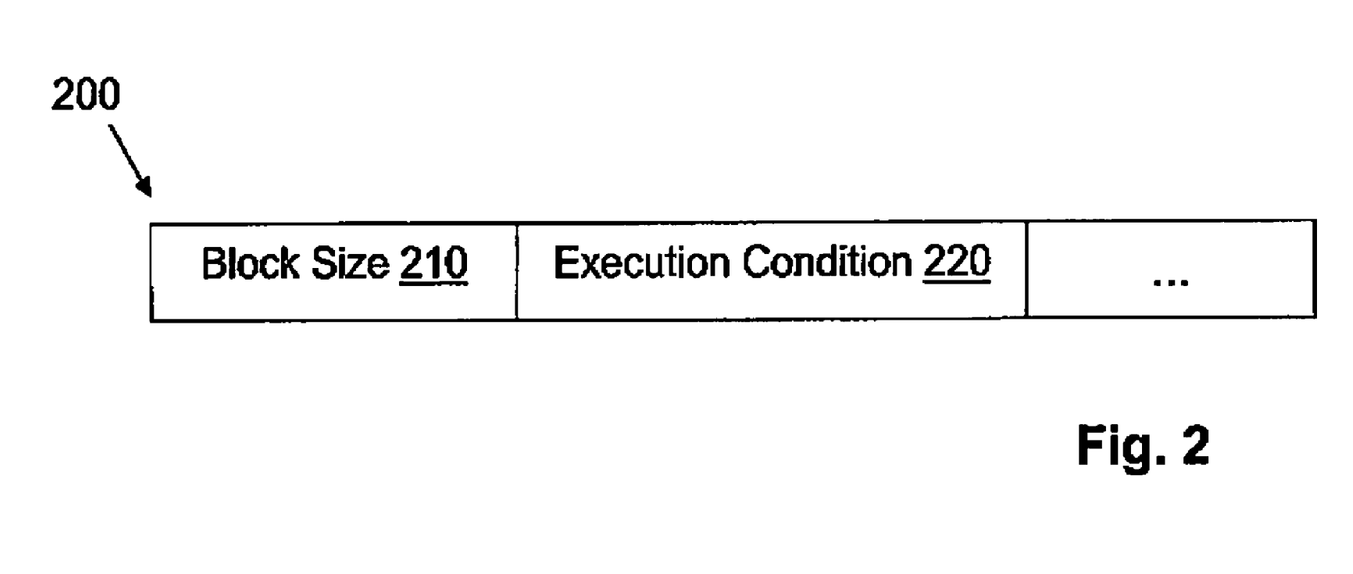
FIG. 2 illustrates one embodiment of an identification instruction.

In addition, instruction issue unit 102 may further forward an identification instruction. Turning briefly to FIG. 2, an embodiment of the identification instruction 200 is shown. The identification instruction, as described herein, is an instruction that precedes the block of conditional execution instructions and comprises the size of the block. In an embodiment, the size of the block is represented by a block size field 210 representing, e.g., the number of conditional execution instructions that are within the block of conditional execution instructions. The identification instruction also defines a condition of execution for the corresponding instructions, represented, e.g., by an execution condition field 220. The condition of execution is a criterion in which each of the conditional execution instructions within the block of conditional execution instructions must meet prior to the completion of the execution process.

Instruction issue unit 102 may further dispatch a grouped number of conditional execution instructions, in which the grouped number of conditional execution instructions is based on a type of dependency for the group. The type of dependency may be relative to the type of conditional execution instruction, in which the type may comprise a dynamic, static, or a general-purpose register, as previously described. For example, a dynamic conditional execution instruction may not be grouped with another dynamic conditional execution instruction because of a stability concerns. Each dynamic conditional execution instruction depends on a hardware flag register, in which the flag needs to be set until after the execution of the dynamic conditional execution instruction is complete. Therefore, if two dynamic conditional execution instructions were grouped together and issued by instruction issue unit 102, then the hardware flag register for the first dynamic conditional execution instruction may be overwritten by the second dynamic conditional execution instruction. As such, the type of dependency may include grouping a first instruction (e.g., dynamic) and a second instruction (static or general-purpose register), wherein the second instruction may not interfere with the execution of the first instruction. Furthermore, the type of dependency may also include grouping a first instruction (e.g., static) and a second instruction (e.g. static), in which the stability of the static hardware flag of the second instruction may not interfere with the static hardware flag of the first instruction. By grouping a number of conditional execution instructions together based on a type of dependency, processing unit 100 may be certain that a result of a conditional execution instruction is properly written back to the intended register. As such, instruction issue unit 102 is coupled to send a tag, a conditional field, an identification instruction, and a conditional execution instruction from a grouped number of conditional execution instructions to implementation unit 112 via instruction bus 114.

Processing unit 100 may include functional unit 110. Functional unit 110 may comprise one or more functional units coupled to process an instruction. For example, functional unit 110 may comprise an arithmetic logic unit (ALU) coupled to compute an arithmetic function for an instruction. In another example, functional unit may include a multiply-accumulate and arithmetic unit (MAU) coupled to perform an arithmetic function. The functional unit (e.g., ALU or MAU) may be processing an instruction and, furthermore, may create an execution tag relative to the instruction. Functional unit 110 may be coupled to send the execution tag and status flags to implementation unit 112, via tag bus 120.

Processing unit 100 may include implementation unit 112, in which implementation unit 112 may be coupled to receive instructions from instruction bus 114 and tag bus 120. Implementation unit 112 may include an identifying unit 104 coupled to compare the tag from the instruction issue unit 102 and the execution tag from functional unit 110. If the tags match, functional unit 110 may be processing a conditional execution unit within the grouped number of conditional execution instructions. As such, the conditional execution instruction may be evaluated to confirm if a condition of execution is met.

In addition, implementation unit 112 may further include evaluation unit 106. Evaluation unit 106 is coupled to determine the position of the conditional execution instruction received from identifying unit 104 via transfer bus 116. The evaluation unit 106 may be coupled to receive the tag, in which the tag may comprise the size (e.g., the number of instructions within the block of conditional execution instructions) and the position of the conditional execution instruction relative to the block of conditional execution instructions. By determining the position of the instruction, processing unit 100 may be able to determine how many more conditional execution instructions are forthcoming for the block.

Implementation unit 112 may further include execution unit 108. Execution unit 108 is coupled to receive identification instruction, which comprises the condition of execution for a block of conditional execution instruction and the conditional execution instruction from evaluation unit 106 via instruction bus 118. As such, execution unit 108 may further be coupled to determine if the condition of execution is met by the conditional execution instruction. Therefore, if the condition of execution is met, the result of the conditional execution instruction may be written to a destination register. Conversely, if the result is not met, processing unit 100 may continue to evaluate subsequent conditional execution instructions.

Figure 3:
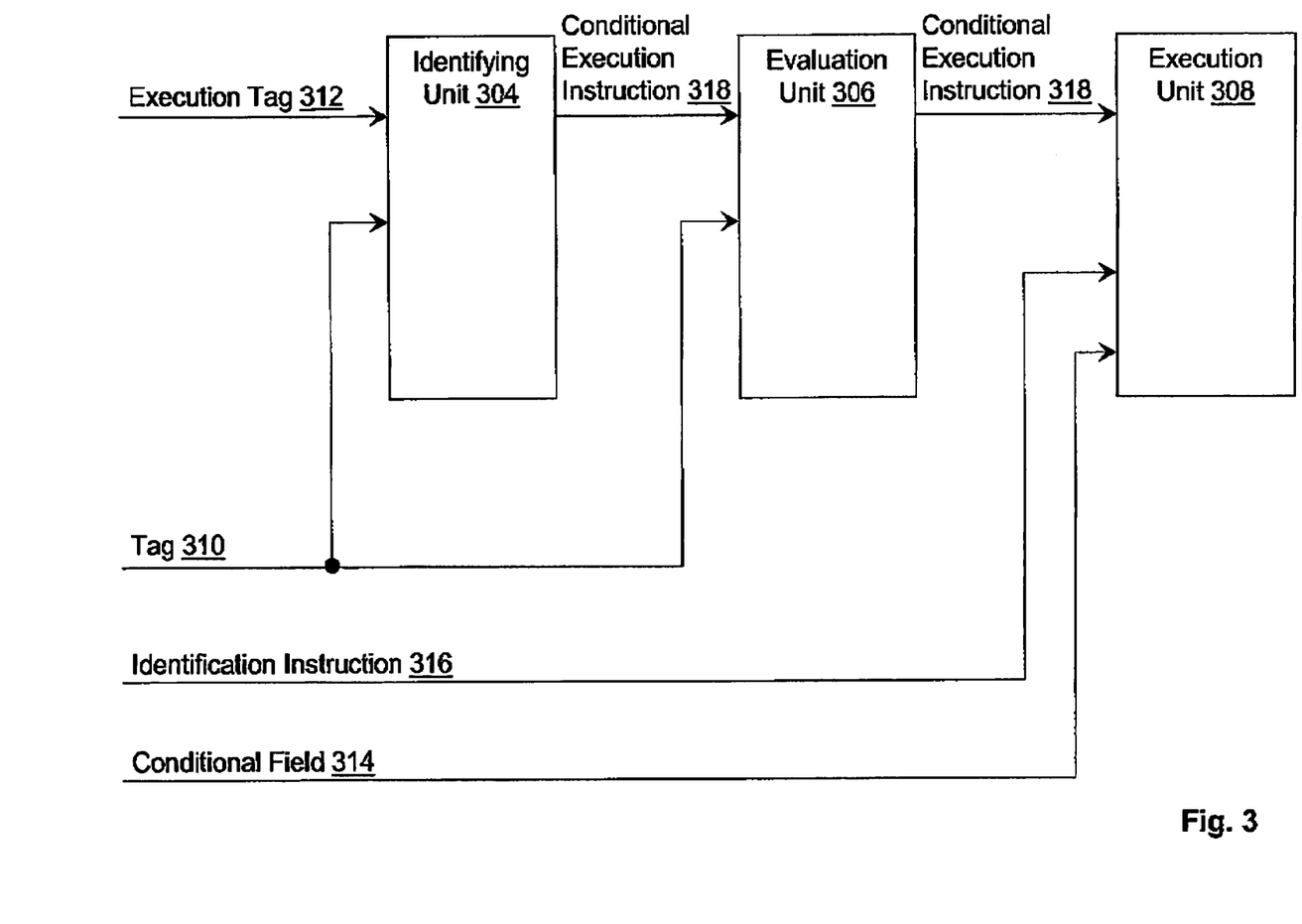
FIG. 3 is a block diagram illustrating one embodiment of a circuit for evaluating conditional execution instructions.
Figure 4A:
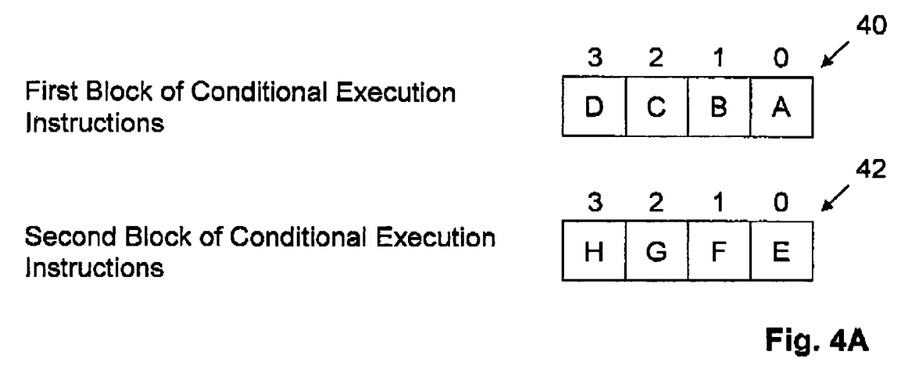
FIG. 4A is a block diagram illustrating exemplary data blocks represented within the circuit illustrated in FIG. 3, in which a first and second block of conditional execution instructions are issued in parallel.
Figure 4B:
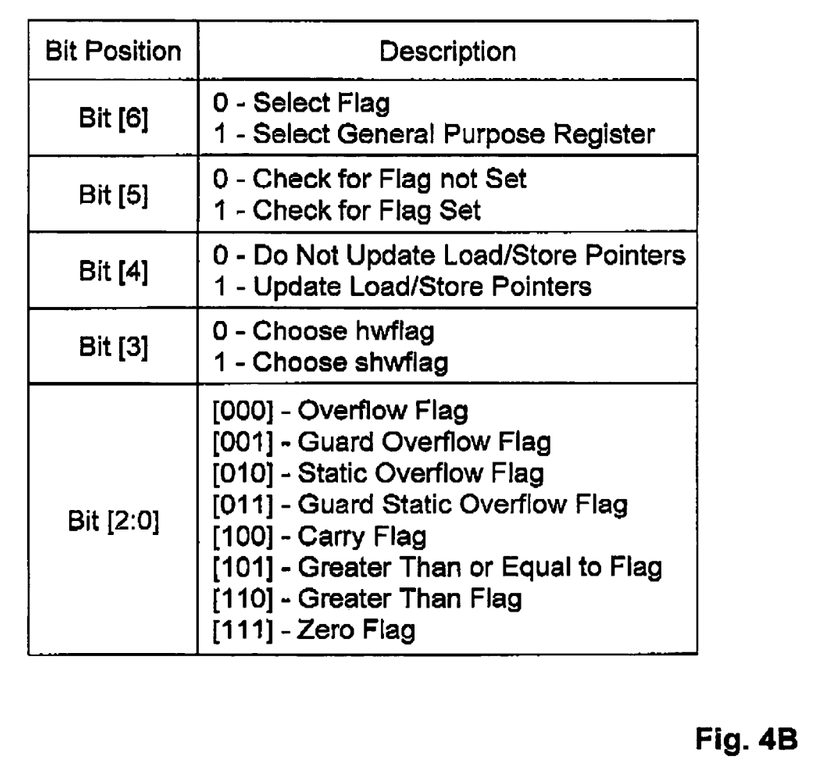
FIG. 4B is a block diagram illustrating exemplary data blocks represented within the circuit illustrated in FIG. 3, in which the conditional field identifies the type of conditional execution instruction.

The computer system described above for evaluation of conditional execution instructions may be discussed in greater detail with references to FIG. 3 and FIG. 4. In particular, FIG. 4 is an example of the data blocks (i.e., a block conditional execution instructions), which corresponds to identifying unit 304, evaluation unit 306, and execution unit 308, as shown in FIG. 3.

Identifying unit 304, as shown in FIG. 3, is coupled to receive tag 310 corresponding to a conditional execution instruction contained within a grouped number of conditional execution instructions. Furthermore, identifying unit 304 may further be coupled to receive execution tag 312 relating to an instruction processing on a functional unit. However, in some cases, there are multiple functional units processing multiple instructions at a given time. As such, in order to identify if a functional unit contains a conditional execution instruction, the functional unit sends execution tag 312, which may be compared with tag 310 corresponding to a conditional execution instruction. If the tags match, then the conditional execution instruction is further evaluated. Conversely, if the tags do not match, then the instruction does not need to be evaluated to see if a condition of execution is met.

Alternatively, identifying unit 304 may receive multiple tags corresponding to multiple blocks of conditional execution instructions being issued by a processing unit in parallel. As such, tag 310 may further comprise a specific block identification. The block identification may determine which block a conditional execution instruction belongs to in the case of multiple blocks being issued. As mentioned above, there are multiple functional units processing multiple instructions at a time. Therefore, identifying unit 304 may compare more than one set of tags (e.g. the tags corresponding to the conditional execution instructions and the execution tags from the functional units).

Evaluation unit 306 may receive conditional execution instruction 318 to determine the position of the conditional execution instruction within a block of conditional execution instructions. Evaluation unit 306 may be coupled to receive tag 310, in which the tag, as described above, corresponds to a position of the condition execution instruction relative to the block of conditional execution instructions. Evaluation unit 306 is coupled to determine the position of the conditional execution instruction by decoding a set of bits within tag 310. Furthermore, by determining a position of the conditional execution instruction, the processing unit may be able to determine how many more subsequent instructions are to be evaluated for a block of conditional execution instructions.

Evaluation unit 306 may be coupled to receive more than one conditional execution instruction. Evaluation unit 306 may be coupled to receive more than one tag corresponding to a conditional execution instruction. The position of the conditional execution instruction determines how many subsequent instructions are remaining in a block of conditional execution instructions prior to evaluating the next block of conditional execution instructions. Therefore, evaluation unit 306 may be coupled to determine a position of conditional execution instruction for each of the first and second blocks of conditional execution instructions.

Execution unit 308 may be coupled to receive conditional execution instruction 318 to determine if a condition of execution for conditional execution instruction is met. Execution unit 308 may receive identification instruction 316, in which identification instruction 316 may comprise a condition of execution. Conditional execution instruction 318, must thereby, meet the condition of execution in order for the result to be valid. Furthermore, execution unit 308 may also be coupled to receive conditional field 314, in which conditional field 314 may comprise a type of conditional execution instruction. Based on the type of conditional execution instruction, execution unit may determine if the condition of execution is met.

First block of conditional execution instructions 40, as illustrated in FIG. 4, may comprise 4 slots, each slot corresponding to an instruction. Identification instruction (e.g., instruction A) precedes the remaining slots of first block of conditional execution instructions 40, wherein identification instruction comprises of the size of first block of conditional execution instructions 40 (e.g., 3 conditional execution instruction) and a condition of execution for first block 40. Furthermore, for example, instruction B and C are grouped together based on a type of dependency. As such, first block 40 contains two grouped numbers of conditional execution instruction: first, instruction B and C and second, instruction D.

Prior to evaluation, a tag is generated for each of the conditional execution instructions within first block 40 (e.g. instructions B–D), in which the tag identifies that instructions B–D belong to first block 40 and a position for each instruction. For example, instruction B is the first conditional execution instruction, instruction C is the second conditional execution instruction, and instruction D is the third conditional execution instruction within first block 40.

Evaluation unit 306 of FIG. 3 may be coupled to determine from tag 310, a position for a conditional execution instruction relative to a block of conditional execution instructions.

A conditional field for each of the instructions of first block 40 is also determined. FIG. 4B illustrates the set of bits that relate to the conditional field. Bits [2:0] correspond to the dynamic and static flags, and bit [3] determines if the static or dynamic flag is utilized. Bit [4] determines if the pointer to a load and store operation is updated depending on it the condition of a conditional execution instruction is met. By setting bit [4], the pointer can be updated even if the conditional execution does not meet the condition. Bit [5] informs if the condition of the conditional execution instruction is to be checked for flag set or flag reset status, e.g., start counting if flag set or stop counting if flag is reset. If bit [6] is set, then bits [2:0] and bit [3] are used to determine, of sixteen general-purpose registers, which register corresponds to the conditional execution instruction. As such, execution unit 308, as illustrated in FIG. 3, may be coupled to receive conditional field 316, and identification instruction 314 to determine if a condition execution is met for a conditional execution instruction.

In some cases, processing units are capable of issuing more than one block of conditional execution instructions at a time. FIG. 4A illustrates a second conditional execution instruction 42 of conditional execution instructions F–H and an identification instruction, E. A tag and a conditional field corresponding to each of the instructions within second block 42 are determined. During the evaluation and execution of conditional execution instructions, evaluation unit 306 may further be coupled to determine if conditional execution instruction 318 belongs to a first block or a second block of conditional execution instructions. Furthermore, the positions of the conditional execution instructions are important to determine a remaining number of conditional execution instructions within the first block that need to be evaluated and executed prior to the evaluation and execution of the conditional execution instructions within the second block. As such, by grouping the number of conditional execution instructions and having an identification instruction preceding a block of conditional execution instructions, and by purging only the failed conditional execution instructions instead of the entire pipeline, the pipeline efficiency increases as well as the overall performance of a processing unit.

Figure 5:
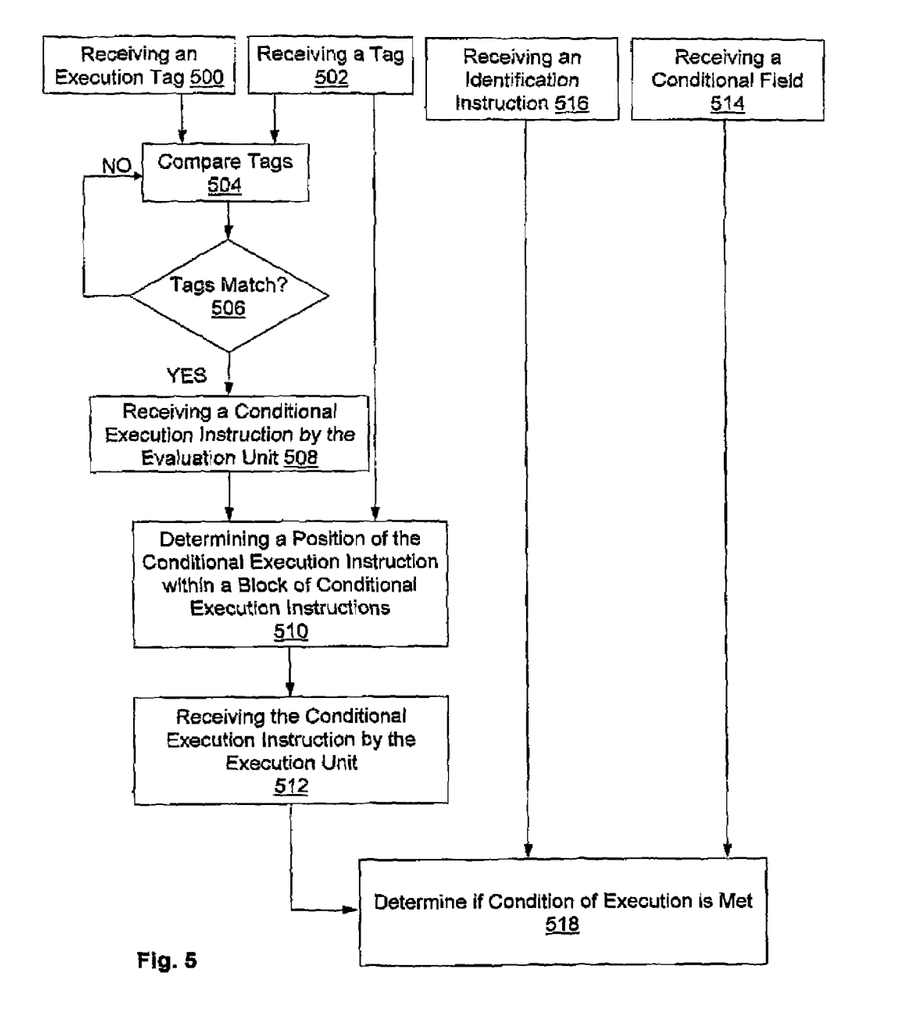
FIG. 5 is a flow diagram illustrating one embodiment of a method for evaluating conditional execution instructions.

FIG. 5 illustrates the exemplary embodiment of a method for evaluating conditional execution instructions. Identifying unit 304, as described in FIG. 3, may receive an execution tag (step 500) sent by a functional unit processing an instruction and a tag corresponding to a conditional execution instruction (step 502). Identifying unit 304 may be coupled to compare the execution tag and the tag to determine if a functional unit has processed a conditional execution instruction (step 504). If the tags do not match identification unit 304 continues to compare subsequent tags (step 506). However, if the tags match, evaluation unit 306 receives the conditional execution instruction (step 508) and determines the position of the conditional execution instruction relative to the block of conditional execution instructions (step 510). In addition, execution unit 308 may be coupled to receive the conditional execution unit (step 512), a conditional field (step 514), and an identification instruction (step 516). The conditional field corresponds to conditional execution instruction received by execution unit 308 (step 512) and comprises the type of conditional execution instruction. Therefore, evaluation unit 308 may further be coupled to determine if the condition of execution, comprised within the identification unit, is met (step 518).

It will be appreciated to those skilled in the art having the benefit of this disclosure that this invention is believed to provide a system, circuit, and method for evaluation of conditional execution instructions. Further modifications and alternative embodiments of various aspects of the invention will be apparent to those skilled in the art in view of this description. The number of conditions based on which testing may be done can be increased or decreased. Also, the length of the queue (e.g., the number of instructions executed per cycle) and the number of conditional execution instruction blocks can be varied to fit the needs of a microprocessor. Furthermore, the method and system may be adaptive to wide-issue super scalar processors, wherein the set of instructions fetched from memory may be expanded or decreased based on the needs of an application. It is intended that the following claims be interpreted to embrace all such modifications and changes and, accordingly, the drawings and the specification are to be regarded in an illustrative rather than a restrictive sense.

What is claimed is:

1. A computer system, comprising:
an identifying unit coupled to receive a tag for each of a grouped number of conditional execution instructions:
an evaluation logic coupled to determine where within a block of conditional execution instructions the grouped number of conditional execution instructions is located; and
an execution unit coupled to receive an identification instruction having a conditional execution field and a block size field for each of the grouped number of conditional execution instructions, wherein the conditional execution field determines whether a condition of execution for each of the grouped number of conditional execution instructions is met, and wherein the block size field describes a size of a block of conditional execution instructions processed by a functional unit.

2. The computer system as recited in claim 1, wherein the identifying unit may further be coupled to receive an execution tag from the functional unit or any other tag generation unit, wherein the execution tag identifies a type of instruction processed by the functional unit, and wherein the execution tag is compared with the tag to detect a conditional execution instruction processed by the functional unit.

3. The computer system as recited in claim 1, wherein the identification instruction is within the block of conditional execution instructions, and wherein the identification instruction may precede the conditional execution instructions within the block.

4. The computer system as recited in claim 1, wherein a grouping of the grouped number of conditional execution instructions is based on a type of dependency between the conditional execution instructions within the group.

5. The computer system as recited in claim 1, wherein at least a portion of the block of conditional execution instruction comprises the grouped number of conditional execution instructions.

6. The computer system as recited in claim 1, wherein the identification instruction identifies a size and the condition of execution for the block of conditional execution instructions.

7. The computer system as recited in claim 1, wherein the conditional field comprises at least one bit value that determines a type of conditional execution instruction as a dynamic, static, or general-purpose instruction.

8. A circuit comprising:
an identifying logic coupled to receive an identification instruction having a block size field describing a size of a block of conditional execution instructions processed by a functional unit, the identification instruction also having a conditional field describing a condition of execution for the block;
an evaluation logic coupled to receive a conditional execution instruction comprised by the block, wherein the evaluation logic is further coupled to determine a position of the conditional execution instruction relative to said block; and
an execution logic coupled to receive the conditional field corresponding to the conditional execution instruction to determine if the condition of execution is met.

9. The circuit as recited in claim 8, wherein the conditional execution instruction is within a grouped number of conditional execution instructions, and wherein each of the grouped number of conditional execution are based on a dependency for the group.

10. The circuit as recited in claim 8, wherein the identifying logic is further coupled to receive an execution tag from the functional unit and a tag corresponding to the conditional execution instruction.

11. The circuit as recited in claim 10, wherein the identifying logic is further coupled to compare the execution tag to the tag to determine if the functional unit has processed the conditional execution instruction.

12. The circuit as recited in claim 8, wherein the identification instruction comprises a size of the block of conditional execution instructions and the condition for execution of the conditional execution instruction.

13. The circuit as recited in claim 8, wherein the conditional field comprises a type of conditional execution for the conditional execution instruction.

14. A method for evaluating conditional execution instructions, comprising:
receiving an identification instruction corresponding to a block of conditional execution instructions, wherein the identification instruction comprises a block size field describing the size of the block and a conditional execution field describing a condition of execution for the block;
receiving a grouped number of conditional execution instructions within the block, each of the grouped number of conditional execution instructions being associated with a tag and a conditional field;
determining where the grouped number of conditional execution instructions is located within the block of conditional execution instruction; and
determining whether the conditional execution instruction satisfies the condition of execution.

15. The method as recited in claim 14, wherein the identification instruction precedes the block of conditional execution instructions.

16. The method as recited in claim 14, wherein each of the grouped number of conditional execution instructions corresponds to a type of dependency for the group.

17. The method as recited in claim 14, wherein the conditional field comprises a type of conditional execution instruction.

18. The method as recited in claim 14, wherein the step of determining where the grouped number of conditional execution instructions is located within the block of conditional execution instructions further comprises determining an execution tag generated by a functional unit that has processed a conditional execution instruction within the grouped number of conditional execution.

19. The method as recited in claim 18, wherein the execution tag is compared to the tag.

20. The method as recited in claim 17, wherein the step of determining whether the conditional execution instruction satisfies the condition of execution further comprises determining the type of conditional execution instruction.

* * * * *